Patented Apr. 5, 1932

1,852,672

UNITED STATES PATENT OFFICE

HARRY C. PEFFER, RICHARD L. HARRISON, AND DAVID E. ROSS, OF LA FAYETTE, INDIANA, ASSIGNORS TO ROSTONE, INCORPORATED, OF LA FAYETTE, INDIANA, A CORPORATION OF INDIANA

STRUCTURAL MATERIAL AND PROCESS OF MAKING SAME

No Drawing. Application filed February 18, 1929. Serial No. 341,030.

Our invention relates to a new material possessing chemical and physical properties that specially adapt it for use in decorative and ornamental arts and also for structural and other purposes, and includes the material and the process for producing the same.

The invention is based upon our discovery that, contrary to common belief, reaction will readily take place under proper conditions, to be hereinafter set forth, between an alkaline earth base and the aluminosilicic acids comprising the so-called "clay matter" of the clay minerals, (slates, shales and certain clays) resulting in a new material, or new materials, having new and useful properties.

Our experiments demonstrate that the controlling agencies in this reaction are temperature (to be hereinafter set forth), and the presence in the mixture of alkaline earth and clay mineral of a certain optimum quantity of water, the water being added as required in liquid form at some stage during the mixing of the ingredients and intimately commingled therewith prior to induration and remaining as a necessary component of the product throughout the course of the indurating reaction.

Heating to the required temperature may be accomplished by any convenient agency, provided care is taken to prevent loss of the water added to the mixture and necessary to the reaction between the base and acid.

We have obtained satisfactory induration of the mass by (a) the use of steam, by (b) heating in an open vessel, (c) in a hydrocarbon oil, or (d) in an aqueous solution of proper boiling point. Also (e) by means of an oven heated externally and steam, at atmospheric pressure, being injected into the oven to prevent excessive evaporation of water from the mass: heating in an oven, as above, without injection of steam, fails to produce the indurating reaction.

In the following description of our process we will, for the purpose of illustration, refer to the form of aluminosilicic acid apparently most common in clay minerals, ($Al_2O_3$, $2SiO_2$, $2H_2O$); it being understood that one or more forms may be present in a given clay substance and require slightly varying proportions of base for reaction.

(1) In carrying out our process we use as essential raw materials:—

(a) Mineral substances, (slates, shales, and certain clays) from various sources.

(b) Lime, "light-burned" magnesia, or other alakaline earths.

(c) Water, added to the above, as a necessary ingredient, during mixing.

We preferably use mineral shales, as these occur widely distributed in beds of considerable extent, of homogeneous composition and of the proper degree of purity. We have also employed successfully a mineral known as halloysite or indianite, which occurs in a state of high purity without admixture of free silica or other foreign mineral forms. We preferably first dry the shale or base material until it contains say one percent or less of free water, and then freely reduce or pulverize same by any suitable means.

(2) The shale is first finely ground or pulverized, and mixed with lime or magnesia in the proportion of substantially one mole of base to one mole of acid.

For example, in the specific case of lime, and a locally occurring shale commonly termed Fountain county (assuming a mixture of 314 parts of dry components) we would use 56 parts of lime and 258 parts of acid ($Al_2O_3$, $2SiO_2$, $2H_2O$) and from 78 to 169 parts of water; in other words, based on 314 parts of dry components, the quantity of water ranges from 20% to 35%, depending on the colloidal condition of the mineral. If at times more water should be added than the amount that will give best results in induration, the excess can be easily removed by evaporation. On the other hand if too little water was added to the mix, more cannot be added after the shapes are formed. Where magnesia is used in place of lime the proportions would be 40 parts magnesia, 258 parts "acid" and 74 to 160 parts of water. It is obvious that the base requirements of another acid of the series would differ from that given.

In the mineral anorthite, ($Al_2$, $O_3$, $2SiO_2$, $CaO$) the percentage of CaO is 20, whereas in chabazite, ($Al_2O_3$, $5SiO_2$, CaO, $7H_2O$) the percentage of CaO is 9.5.

3. Incorporation of the base with the mineral is effected by well known methods, either in the wet or dry condition. In either case the amount of water necessary in the mass for carrying out the subsequent reaction is substantially 20–33% (based on the dry weight of the solid constituents). In the specific case of the shale hereinbefore referred to 20% to 25% is sufficient to permit of easy working. If more highly colloidal clays are used, the water content may be from 25% to 35%.

The mass so made up may be molded or otherwise formed either by hand or mechanical means, into suitable shapes, as in ordinary ceramic practice. The raw mass so formed has sufficient strength and tenacity before indurating or hardening to permit of its being shaped in a lathe or on a wheel, or of being carved or otherwise fabricated.

(4) Hardening or induration of the shaped mass is effected by exposure to the action of heat, while maintaining within the mass a substantially constant proportion of water. Excess of water above the optimum causes boiling and crumbling, deficiency in water results in a weak and chalky product.

The process may be performed as follows:

To produce our artificial structural material we may mix the alkaline earth base, preferably lime or magnesia; a finely ground mineral composed wholly or in part of aluminosilicic acid; and sufficient water to ensure complete reaction; and then heat the mass, under conditions which will not destroy the essential water content of the mass, until the mass is transformed by reaction into a product possessing high compressive and tensile strength and resistant to attack by chemical agents. Or we may mix the alkaline earth base and the finely ground mineral, and add water, and then subject the mixture to heat, in presence of water vapor, to cause reaction between the base, aluminosilicic acid and water, and produce the desired product. Or we may mix the alkaline earth base, finely ground mineral and sufficient water to insure complete chemical reaction, and indurate the mass with steam at substantially atmospheric pressure until the mass is transformed into the desired material.

As a heating medium we preferably, but not necessarily, employ steam; other agencies are effective as hereinbefore recited.

The effect of steam under pressure in inducing chemical reactions is well known and understood, particularly with reference to silicate technology.

Our use of steam differs from all others, first, because in our process it is effective at substantially atmospheric pressure, which constitutes an important practical advantage. Secondly because it is used as one convenient means of heating, but not as the sole means of heating.

In practice good induration is obtained by the use of steam at substantially atmospheric pressure, and corresponding temperature of substantially 212 degrees F. We however may when treating counter current superheat the steam to any desired temperature, dictated by varying composition in our raw materials, but avoiding high pressures, using only sufficient pressure to secure good circulation.

The indurating reaction for small or medium sized pieces readily takes place in from one to four hours under the conditions set forth. For pieces of larger size a longer period will be required.

The several steps of our process and features of our product which characterize it as new are: (1) The reaction between an alkaline earth base and an aluminosilicic acid. Heretofore aluminosilicic acids have been held by competent authorities to be of low reactivity, whereas we find that under proper conditions they react readily. (2) The influence of water in bringing about this reaction. Heretofore investigators in this field have failed to secure reaction because they have failed to recognize the rôle played by water. We have discovered the activating influence of water in producing reaction between an alkaline earth base and an aluminosilicic acid and the approximate proportion giving best results. (3) The low reaction temperature. Heretofore it has been supposed that the aluminosilicic acids are not reactive below 600° F. and such high temperatures have been secured by high steam pressures.

We have discovered that by heating our mass, in which water in more or less definite quantity is retained in the mass as a definite reacting component, reaction proceeds rapidly at a temperature as low as 212° F.

In the absence of specific need for closer regulation we regard a pressure range of ten pounds as substantially atmospheric pressure. As a matter of fact, due to differenc in the colloidal characteristics of our raw material, to differing degrees of fineness, and to inability at this time to closely control moisture content, we operate through a temperature range at 212° F.–260° F.

(4) Among the structural and other properties by which the product produced by our process is distinguished and differentiated from prior artificial stone compositions are:

(a) Our material is close grained and in forming readily takes the finest impressions; (b) It is lighter than natural building stones and ordinary concrete: (c) It is tough and not brittle, and will dent before breaking if struck with a hard object, thus demonstrating its high resistance to impact, as compared with other materials of its class: (d) It is highly resistant to the action of strong acids and to boiling alkali solutions, as well as to other tests which are destructive to natural and artificial building materials: (e) It is highly fire resisting: (f) It has an average compressive strength which is higher than for most natural and artificial building materials: (g) It can readily be cut, carved or sawed, and takes a polish like natural building stones: (h) It can be colored in the process of forming and retains such colors without change, thus lending itself to highly decorative effects: (i) It unites firmly with metal or other substances, thus readily permitting the use of reinforcing, or the use of aggregates, which it will securely bond.

When using magnesia the process would be followed as when using lime, as above described, but the product resulting from the use of magnesia appears to be more resistant to chemical action than the product resulting from the use of lime.

We claim:

1. The herein described process of producing an artificial structural material possessing high compressive and tensile strength and resistant to attack by ordinary chemical reagents; consisting in intimately mixing an alkaline earth base, a finely ground material composed principally of hydrated aluminosilicic acid, and water; and subjecting the mass to heat in a closed chamber in which is maintained sufficient water vapor to prevent evaporation of the essential reacting water in the mass until the mass is transformed into the aforesaid material.

2. The herein described process of producing an artificial structural material; consisting in mixing an alkaline earth base, a finely ground mineral material containing hydrated aluminosilicic acid, and water in optimum quantity to produce complete reaction; and heating the mass while retaining its essential water content until it is transformed into a product possessing high compressive and tensile strength and resistant to attack by ordinary chemical reagents.

3. The herein described process of producing an artificial structural material; consisting in mixing an alkaline earth base, a finely ground mineral material containing hydrated aluminosilicic acid, and water in proper quantity to produce complete reaction; and thereafter heating the mass by steam at low pressure without substantially altering its essential reacting water content until the mass is transformed into a material possessing high compressive and tensile strength and resistant to attack by ordinary chemical reagents.

4. The herein described process of producing an artificial structural material possessing high compressive and tensile strength and resistant to attack by ordinary chemical reagents; consisting in mixing an alkaline earth base selected from a group consisting of lime and magnesia, a finely ground material composed principally of hydrated aluminosilicic acid, and water, and subjecting the mass to heat and retaining the essential reacting water until the mass is transformed into said material.

5. The herein described process of producing an artificial structural material possessing high compressive and tensile strength and resistant to attack by ordinary chemical reagents; consisting in intimately mixing a finely divided alkaline earth base selected from a group consisting of lime and magnesia, a finely ground material composed principally of hydrated aluminosilicic acid, and water; and subjecting the mass in a closed chamber to heat and maintaining in the chamber sufficient free water vapor to prevent evaporation of the essential reacting water in the mass until the mass is transformed into said material.

6. The herein described process of producing an artificial structural material, consisting in mixing an alkaline earth base and a finely ground mineral material composed substantially of hydrated aluminosilicic acid, adding water in optimum quantity; and subjecting the mixture to heat in presence of water vapor to cause reaction between the base hydrated aluminosilicic acid and water while retaining the optimum water content; resulting in a product possessing high compressive and tensile strength, and resistant to attack by ordinary chemical reagents.

7. The herein described process of producing an artificial structural material resistant to ordinary chemical reagents, consisting in mixing an alkaline earth base, a finely ground mineral material containing hydrated aluminosilicic acid, and sufficient water to cause complete reaction, and indurating with steam at substantially atmospheric pressure, until the mass is transformed into a desired material.

8. The herein described artificial structural material possesing high compressive and tensile strength and resistant to attack by ordinary chemical reagents produced by mixing an alkaline earth base selected from a group consisting of lime and magnesia, a finely ground material composed principally of hydrated aluminosilicic acid, and water in proper proportions and subjecting the mass to heat while retaining essential reacting water therein until the mass is transformed.

9. An artificial structural material produced by subjecting a mixture of an alkaline earth base selected from a group consisting of lime and magnesia, a hydrated aluminosilicic acid mineral and optimum water to produce reaction between the components to heat to cause the water to become an integral part of the mass during reaction; said material possessing high compressive and tensile strength and being resistant to attack by ordinary chemical reagents.

10. An artificial structural material produced by subjecting a mixture of an alkaline earth base, a hydrated aluminosilicic acid mineral and optimum water to produce reaction between the components to heat to cause the water to become an integral part of the mass during reaction; said material possessing high compressive and tensile strength and being highly resistant to attack by ordinary chemical reagents.

11. A material as set forth in claim 10 in which lime is used as the alkaline earth base.

12. The herein described artificial structural material possessing high compressive and tensile strength and resistant to ordinary chemical reagents, produced by mixing an alkaline earth base, a finely ground mineral material containing a hydrated aluminosilicic acid and optimum water to insure complete reaction when heated, and indurating the mass with steam at substantially atmospheric pressure.

13. A material as set forth in claim 12 in which lime is used as the alkaline earth base.

14. The herein described artificial structural material possessing high compressive and tensile strength, and resistant to ordinary chemical reagents, produced by mixing an alkaline earth base, a finely ground mineral material containing hydrated aluminosilicic acid and water in optimum quantity to insure complete reaction when heated, and indurating the mass with steam at low pressure, while retaining in the mass substantially unchanged essential reacting water.

15. A material as set forth in claim 14 in which lime is used as the alkaline earth base.

16. A material as set forth in claim 10 in which magnesia is used as the alkaline earth base.

17. A material as set forth in claim 12 in which magnesia is used as the alkaline earth base.

18. A material as set forth in claim 14 in which magnesia is used as the alkaline earth base.

HARRY C. PEFFER.
RICHARD L. HARRISON.
DAVID E. ROSS.